US007311256B2

(12) United States Patent
Torchalski (10) Patent No.: US 7,311,256 B2
(45) Date of Patent: *Dec. 25, 2007

(54) BARCODE OPTICAL CHARACTER RECOGNITION

(75) Inventor: Karl Torchalski, Arlington Heights, IL (US)

(73) Assignee: ZIH Corp., Hamilton (BM)

( * ) Notice: Subject to any disclaimer, the term of this patent is extended or adjusted under 35 U.S.C. 154(b) by 236 days.

This patent is subject to a terminal disclaimer.

(21) Appl. No.: 10/999,266

(22) Filed: Nov. 30, 2004

(65) Prior Publication Data

US 2005/0077354 A1 Apr. 14, 2005

Related U.S. Application Data

(63) Continuation-in-part of application No. 10/015,876, filed on Dec. 12, 2001, now Pat. No. 6,832,726.

(60) Provisional application No. 60/256,618, filed on Dec. 19, 2000.

(51) Int. Cl.
*G06K 7/14* (2006.01)

(52) U.S. Cl. .................. 235/454; 235/462.13

(58) Field of Classification Search ................ 235/454, 235/492, 487, 462.01, 462.13; 340/572.1
See application file for complete search history.

(56) References Cited

U.S. PATENT DOCUMENTS

| | | | | |
|---|---|---|---|---|
| 3,496,543 A | * | 2/1970 | Greenly | 382/176 |
| 4,411,015 A | * | 10/1983 | Scherl et al. | 382/171 |
| 4,503,556 A | * | 3/1985 | Scherl et al. | 382/176 |
| 4,504,972 A | * | 3/1985 | Scherl et al. | 382/171 |
| 4,513,442 A | * | 4/1985 | Scherl | 382/176 |
| 4,538,072 A | * | 8/1985 | Immler et al. | 250/568 |
| 4,939,674 A | * | 7/1990 | Price et al. | 358/1.9 |
| 5,073,954 A | * | 12/1991 | Van Tyne et al. | 235/462.08 |
| 5,131,053 A | * | 7/1992 | Bernzott et al. | 382/176 |
| 5,202,933 A | * | 4/1993 | Bloomberg | 382/176 |
| 5,335,290 A | * | 8/1994 | Cullen et al. | 382/176 |
| 5,381,489 A | * | 1/1995 | Bernzott et al. | 382/176 |
| 5,465,304 A | * | 11/1995 | Cullen et al. | 382/176 |
| 5,578,797 A | * | 11/1996 | Hewitt et al. | 177/5 |
| 5,621,864 A | * | 4/1997 | Benade et al. | 358/1.18 |

(Continued)

FOREIGN PATENT DOCUMENTS

EP 0 311 437 A2 4/1989

(Continued)

*Primary Examiner*—Daniel Stcyr
(74) *Attorney, Agent, or Firm*—Alston & Bird LLP (57) ABSTRACT

Computer software which includes code configured to create a printer label format based on a printed label that has been scanned. The code is configured to scan a label by either using a plurality of different types of scanners, or by using a single piece of hardware which can perform a plurality of different types of scans. Then, the scanned label is used to generate a label format. The label format created from the scanned label is thereafter useable to print labels similar in format to the label which was scanned. Preferably, barcodes are recognized as barcodes, and not just as graphics. Preferably, a user is prompted, via a visual display, to confirm that the scanned objects have been correctly characterized and the user can change any of the characterizations made by the software. The user can link any object to a variable field, and can add embedded printer-specific non-printing control codes to the label format.

26 Claims, 8 Drawing Sheets

U.S. PATENT DOCUMENTS

| | | | | |
|---|---|---|---|---|
| 5,751,849 A | * | 5/1998 | Ikeda | 382/176 |
| 5,815,595 A | * | 9/1998 | Gugler | 382/173 |
| 5,892,843 A | * | 4/1999 | Zhou et al. | 382/176 |
| 5,895,475 A | * | 4/1999 | Eisenberg | 715/517 |
| 5,920,684 A | * | 7/1999 | Hastings et al. | 358/1.13 |
| 5,988,898 A | * | 11/1999 | Ackley | 400/61 |
| 6,005,680 A | * | 12/1999 | Luther et al. | 358/2.1 |
| 6,427,032 B1 | * | 7/2002 | Irons et al. | 382/306 |
| 6,573,200 B2 | * | 6/2003 | Pakerisamy et al. | 438/800 |
| 6,836,215 B1 | * | 12/2004 | Laurash et al. | 340/572.1 |
| 2005/0021172 A1 | * | 1/2005 | Winter et al. | 700/228 |
| 2005/0058483 A1 | * | 3/2005 | Chapman et al. | 400/76 |

FOREIGN PATENT DOCUMENTS

| | | |
|---|---|---|
| EP | 0 516 576 A2 | 12/1992 |
| JP | 2014392 | 1/1990 |
| JP | 2250193 | 10/1990 |

\* cited by examiner

Ship To:

JetForm Corporation
560 Rochester St., Ottawa
ON, Canada, K1S- 5K2

Received From:

Zebra Technologies Corporation
333 Corporate Woods Parkway
Vernon Hills, Illinois 60061.3109
USA

Order No: 123456AB

30 Sep 1998
September 30, 1998
21:45

Ser. No: 123

Delivery Note No:
1234567

BARCODE OPTICAL CHARACTER RECOGNITION

RELATED APPLICATION

This application is a continuation-in-part of U.S. patent application Ser. No. 10/015,876, filed Dec. 12, 2001 now U.S. Pat. No. 6,832,726, which claims the benefit of U.S. Provisional Application Ser. No. 60/256,618, filed Dec. 19, 2000.

BACKGROUND

The present invention relates generally to computer software packages for creating and editing printer label formats, and relates more specifically to a computer software package which can create a printer label format based on a printed label that has been scanned. The present invention also specifically relates to a method of creating a printer label format by scanning a printed label.

Barcode printers, such as on-demand barcode printers, use label formats to print labels. Presently, software packages are available which a user can use to create and edit printer label formats. For example, there are a variety of software packages for the PC (personal computer) and Macintosh® which a user can use to design barcode label formats.

The software packages which are generally available are user-friendly and generally make creating and editing a label format easy for a user. Such software packages generally provide that the label format is displayed on a computer monitor as the user uses the software package to design the label format. The user can place text, graphical objects, barcode objects, etc. onto a graphical representation of a printed label, and can manipulate the objects into the desired label design. Typically, the user can also link any of the objects to variable data. In addition, these software packages generally provide that the user can embed special printer command codes into the label format, where the command codes subsequently do not physically print, but rather control specific features of the printer which subsequently uses the label format to print labels.

These software packages are convenient for a user to use to create new label formats and to edit existing label formats, so long as the existing label format has been created using the same software package (or a compatible package). However, these software packages do not provide that a user can easily import existing label formats that were not created using the software package (or a compatible package), such as printer labels which were created in a printer-specific command language. The software packages which are presently available require that a user has to manually create a similar label format from scratch, manually interpreting and measuring the different features and characteristics of the label. This process is often time consuming and obviously provides room for error. Furthermore, if the label contains any barcodes, the user must be able to identify the barcodes as the user designs the label format. Hence, the user needs to be trained and experienced in barcodes in order to create an accurate label format that includes barcodes.

Another aspect of the present invention relates to optical character recognition (OCR) software. OCR software has been available for many years, and currently recognizes characters, fonts and graphics, such as raster or vector graphics. Current OCR software also recognizes certain primitive formatting, such as margins, indents, tabs, etc. However, current OCR software does no generally recognize barcodes, such as what type of barcode a scanned barcode is, or any of the parameters associated with the barcode which has been scanned. Instead, current OCR software typically interprets a barcode as a mere graphic.

OBJECTS AND SUMMARY

An object of an embodiment of the present invention is to provide a computer software package which can create a printer label format based on a printed label that has been scanned.

Another object of an embodiment of the present invention is to provide a method of creating a printer label format by scanning an existing, printed label.

Still another object of an embodiment of the present invention is to provide OCR software which can identify barcodes.

Yet another object of an embodiment of the present invention is to provide software which provides for multiple types of scans of a label (either in a single pass or in multiple passes using different types of scanners/readers), including reading of an RFID tag on the label.

Briefly, and in accordance with at least one of the foregoing objects, an embodiment of the present invention provides computer software which is configured to create a printer label format based on a printed label that has been scanned. Specifically, the software provides that an existing label is scanned, and then the software converts the scan into a label format through optical character recognition (OCR). Preferably, the software is configured such that text on the label is recognized as text, graphics are recognized as graphics, etc. and anything on the label which is not specifically recognized by the software is characterized as being a graphic. Preferably, the software recognizes barcodes as barcodes, and not just as graphics. Subsequently, the software preferably prompts a user, using a visual display, to confirm that the scanned objects have been correctly characterized and allows the user to change any of the characterizations made by the software. Additionally, preferably the software allows the user to link any of the objects to a variable field, and to input embedded printer-specific non-printing control codes into the label format. The software preferably provides that once this process is complete, and a label format has been created, the label format can be saved and printed at any time, using any supported printer.

Another object of an embodiment of the present invention is to provide a method of creating a printer label format by scanning a printed label. Specifically, the printed label is scanned, and then the scanned label is converted to a label format. One or more objects may be linked to a variable field, and embedded printer-specific non-printing control codes may be added to the label format. Once this process is complete, and a label format has been created, the label format can be saved and printed at any time, using any supported printer.

Still another object of an embodiment of the present invention is to provide OCR software which is configured to identify barcodes as being barcodes and not just as graphics.

BRIEF DESCRIPTION OF THE DRAWINGS

The organization and manner of the structure and function of the invention, together with further objects and advantages thereof, may be understood by reference to the following description taken in connection with the accompanying drawings, wherein.

DESCRIPTION

While the present invention may be susceptible to embodiment in different forms, there is shown in the drawings, and herein will be described in detail, an embodiment of the invention with the understanding that the present description is to be considered an exemplification of the principles of the invention and is not intended to limit the invention to that as illustrated and described herein.

Figure 1:
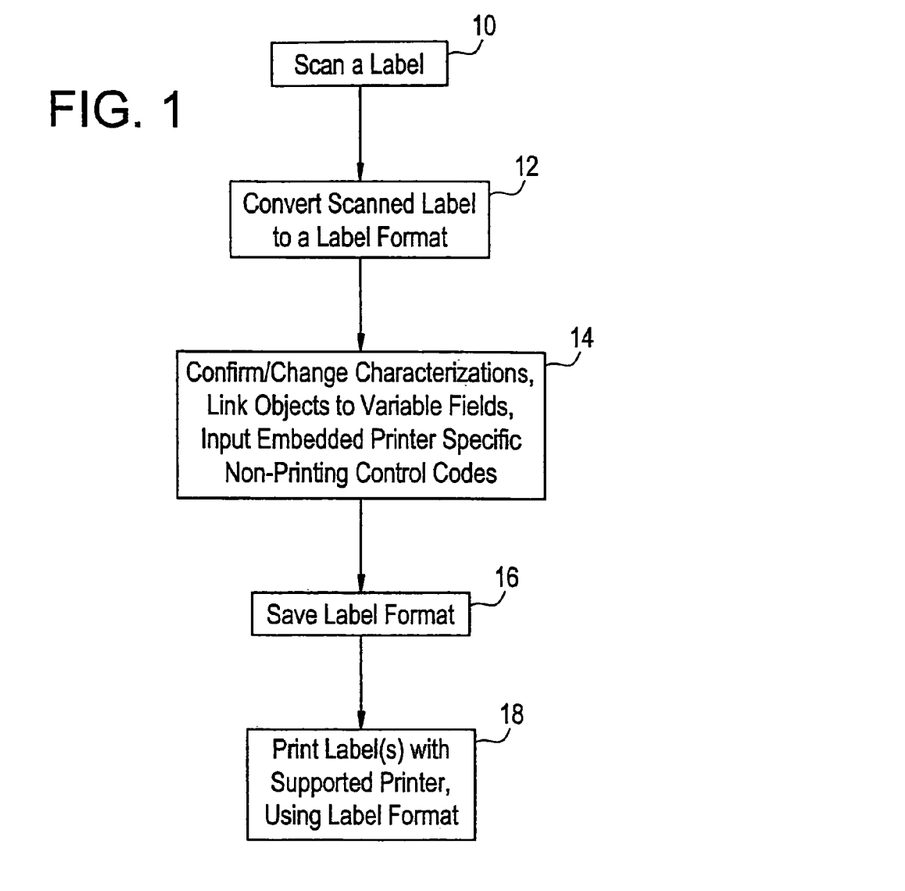
FIG. 1 is a block diagram of a method of creating a label format, where the method is in accordance with an embodiment of the present invention.

FIG. 1 provides a block diagram of a method of creating a label format, where the method is in accordance with an embodiment of the present invention. The method provides that a label format can be created by scanning an existing, printed label. As such, a user can easily import existing label formats that were not created using a given software package (or a compatible package), such as printer labels which were created in a printer-specific command language. The method obviates the need for the user to have to manually create a similar label format from scratch, manually interpreting and measuring the different features and characteristics of the label.

As shown in FIG. 1, the method provides that an existing, printed label is scanned (box 10). Then, the scanned label is converted to a label format (box 12), and the user confirms and/or changes characterizations which were made regarding the scanned label (box 14). The user may also link any of the objects to variable fields, and input embedded printer specific non-printing control codes, where the command codes subsequently do not physically print, but rather control specific features of a printer which subsequently uses the label format to print one or more labels. As shown in FIG. 1, once the label format has been created, it can be saved (box 16), and then used by a supported printer to print labels (box 18).

Figure 2:
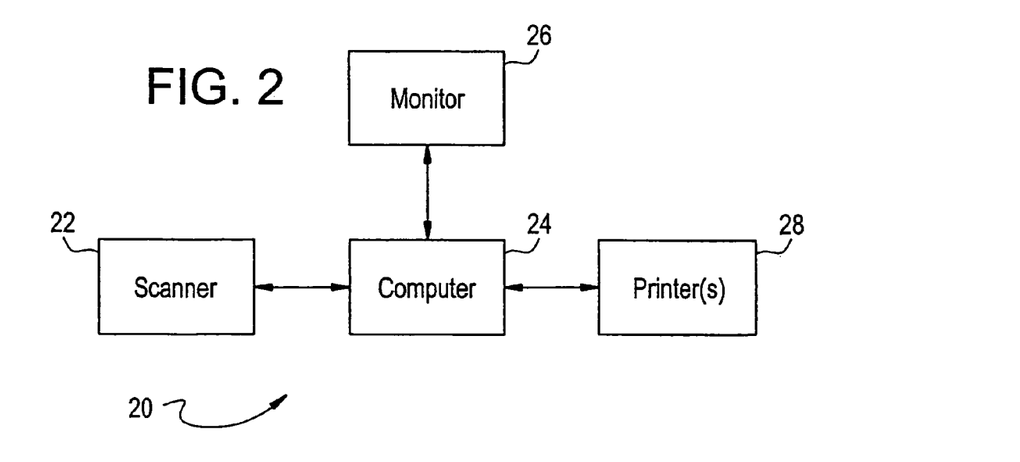
FIG. 2 is a block diagram of a system which can be used to perform the method illustrated in FIG. 1, wherein a computer runs a computer software package which is in accordance with an embodiment of the present invention.
Figure 4:
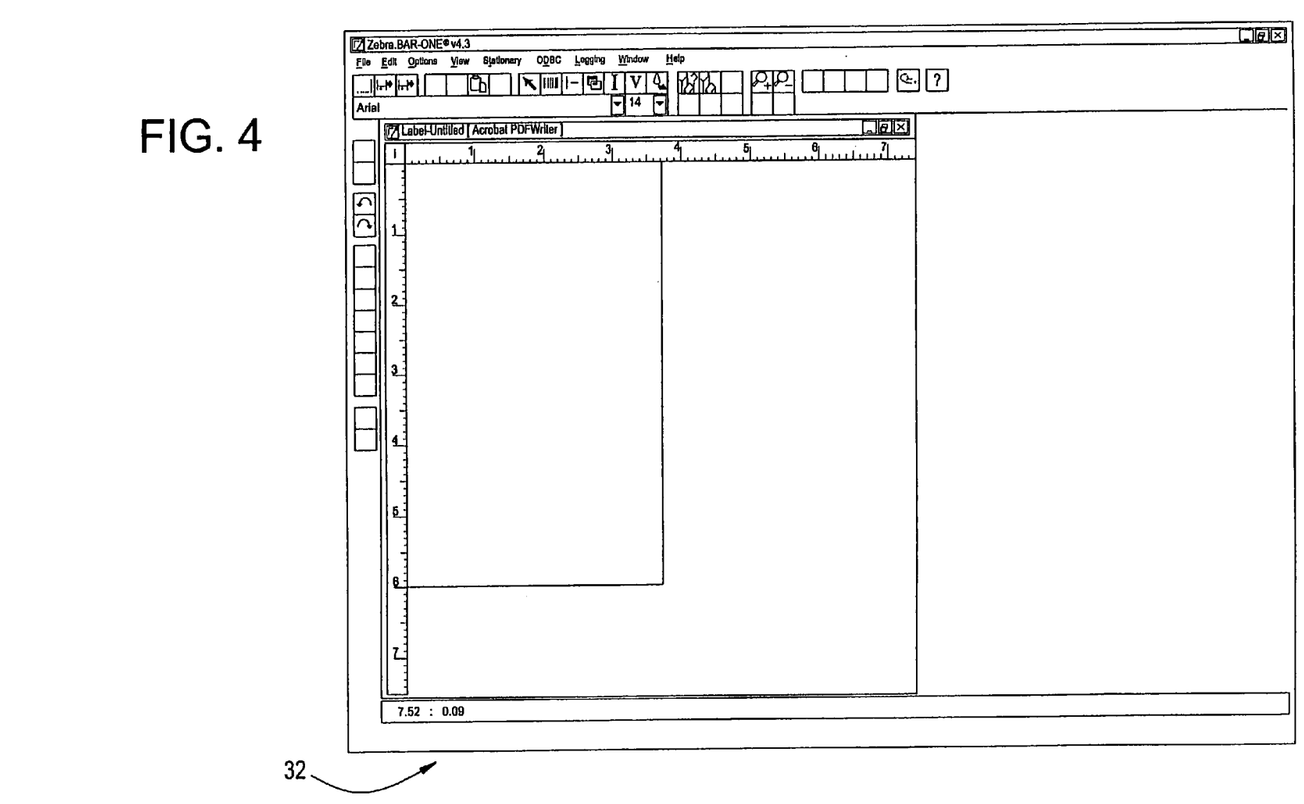
FIG. 4 is a screen shot showing the computer software package opened, before the label shown in FIG. 3 is scanned.

FIG. 2 illustrates a system 20 which can be used to perform the method shown in FIG. 1. As shown in FIG. 2, the system 20 includes a scanner 22 which is connected to a computer 24. The computer 24 is connected to a computer monitor 26 and may be connected to one or more printers 28. Preferably, the computer 24 runs a computer software package which is configured to create a label format based on a scanned label (i.e. in accordance with FIG. 1). The computer software package will be described in more detail below with reference to certain screen shots which are illustrated in FIGS. 4-6.

Figure 3:
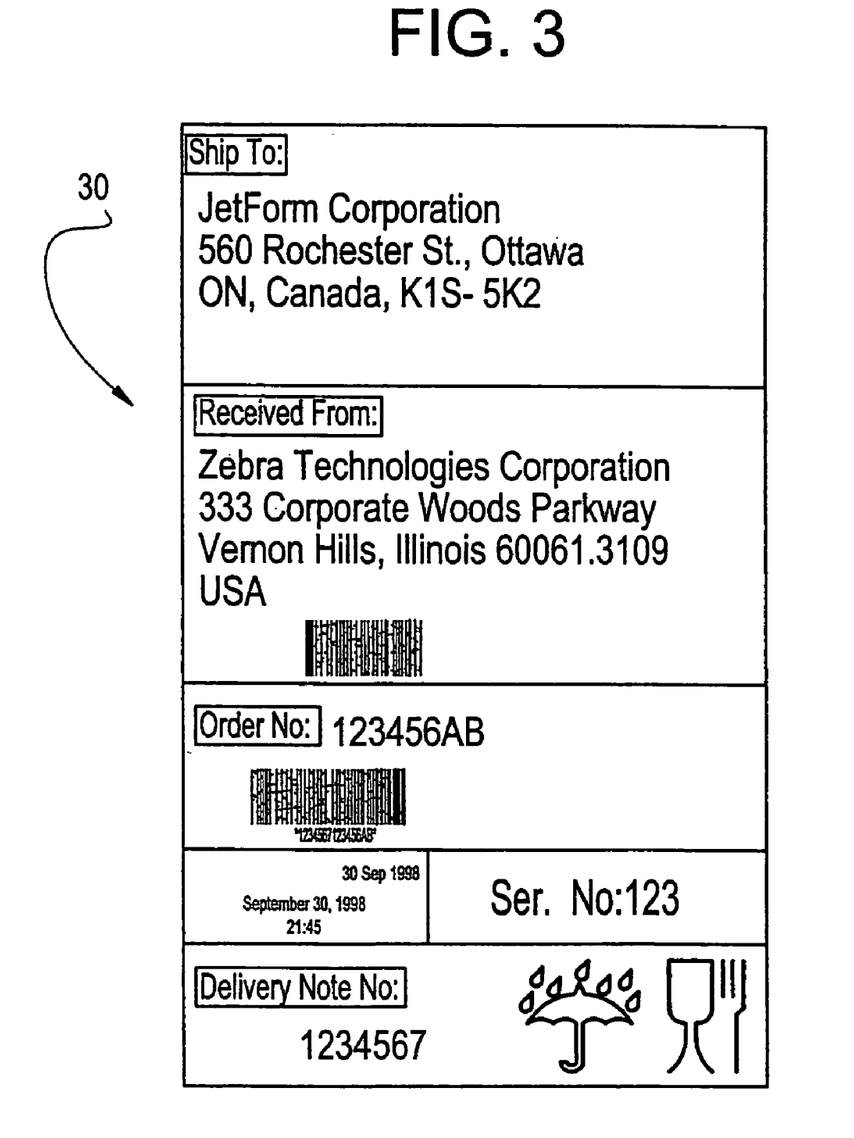
FIG. 3 is an illustration of a printed label sample which has been printed by an existing printer.

The method illustrated in FIG. 1 and briefly described above will now be described in connection with the system 20 shown in FIG. 2 and the computer software package. A sample label 30 which has been printed by an existing printer is illustrated in FIG. 3. Assuming a user wishes to create a label format based on the label 30 shown in FIG. 3, the user places the label 30 on the scanner 22 shown in FIG. 2, and uses the computer 24 shown in FIG. 2 to open the computer software package such that the monitor 26 shown in FIG. 2 provides a screen shot 32 as shown in FIG. 4.

Figure 5:
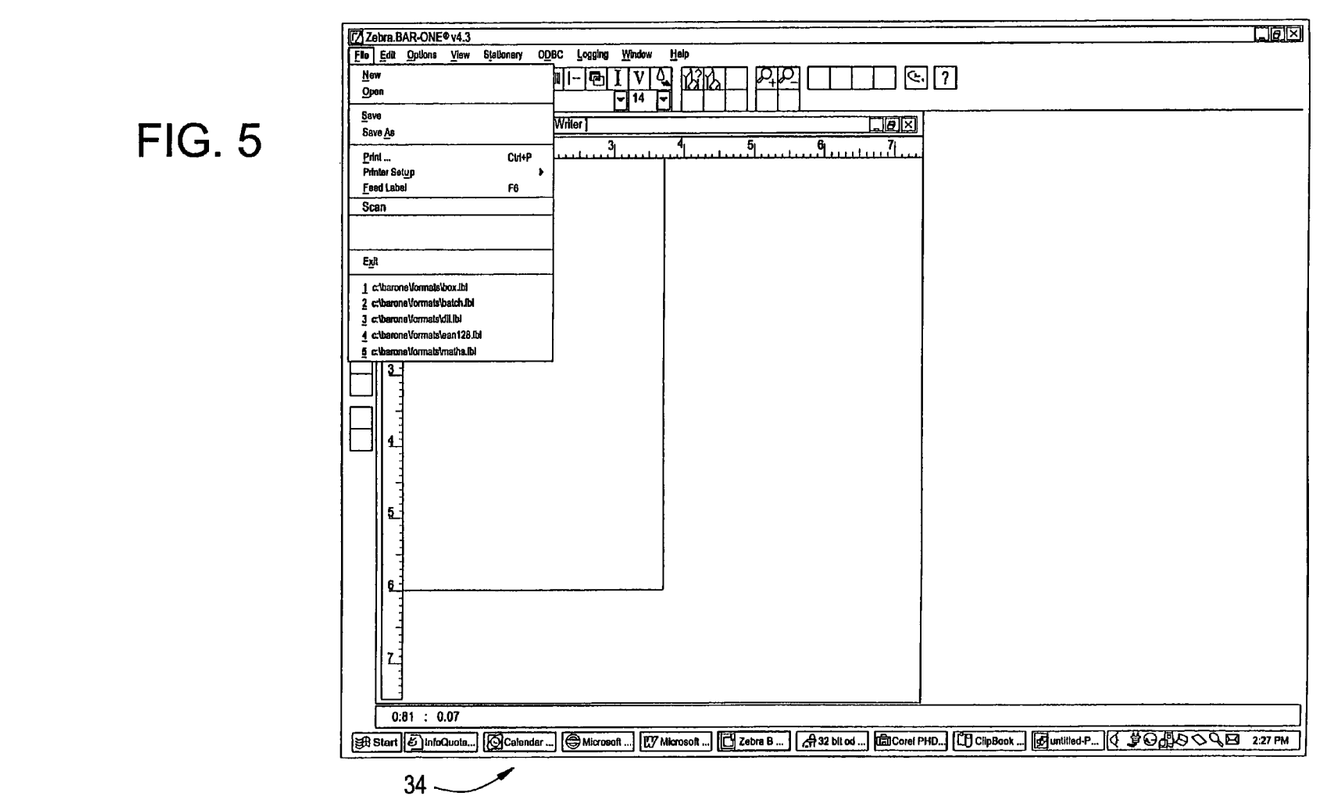
FIG. 5 is a screen shot showing the computer software package being directed to scan.

Subsequently, the user uses the computer 24 shown in FIG. 2 to direct the computer software package to scan the label 30, at which time the monitor 26 shown in FIG. 2 provides a screen shot 34 as shown in FIG. 5. The computer 26 then directs the scanner 22 to scan the label 30, and afterward, the monitor 26 provides a screen shot 36 as shown in FIG. 6, wherein a graphic representation 38 of the label 30 is displayed. The computer software package is configured to convert the scanned label 30 to a label format and in so doing, recognizes text on the label as text, graphics as graphics, etc. and anything on the label which is not specifically recognized by the software is characterized as being a graphic. Preferably, the computer software package is configured to recognize barcodes as barcodes (and not just as a graphic). Specifically, preferably the computer software package is configured to determine what type of barcode (i.e., Code 39, Code 128, Maxicode, etc.) a scanned barcode is, and is configured to determine certain parameters about the barcode, such as aspect ratio, size, and human readability.

Figure 6:
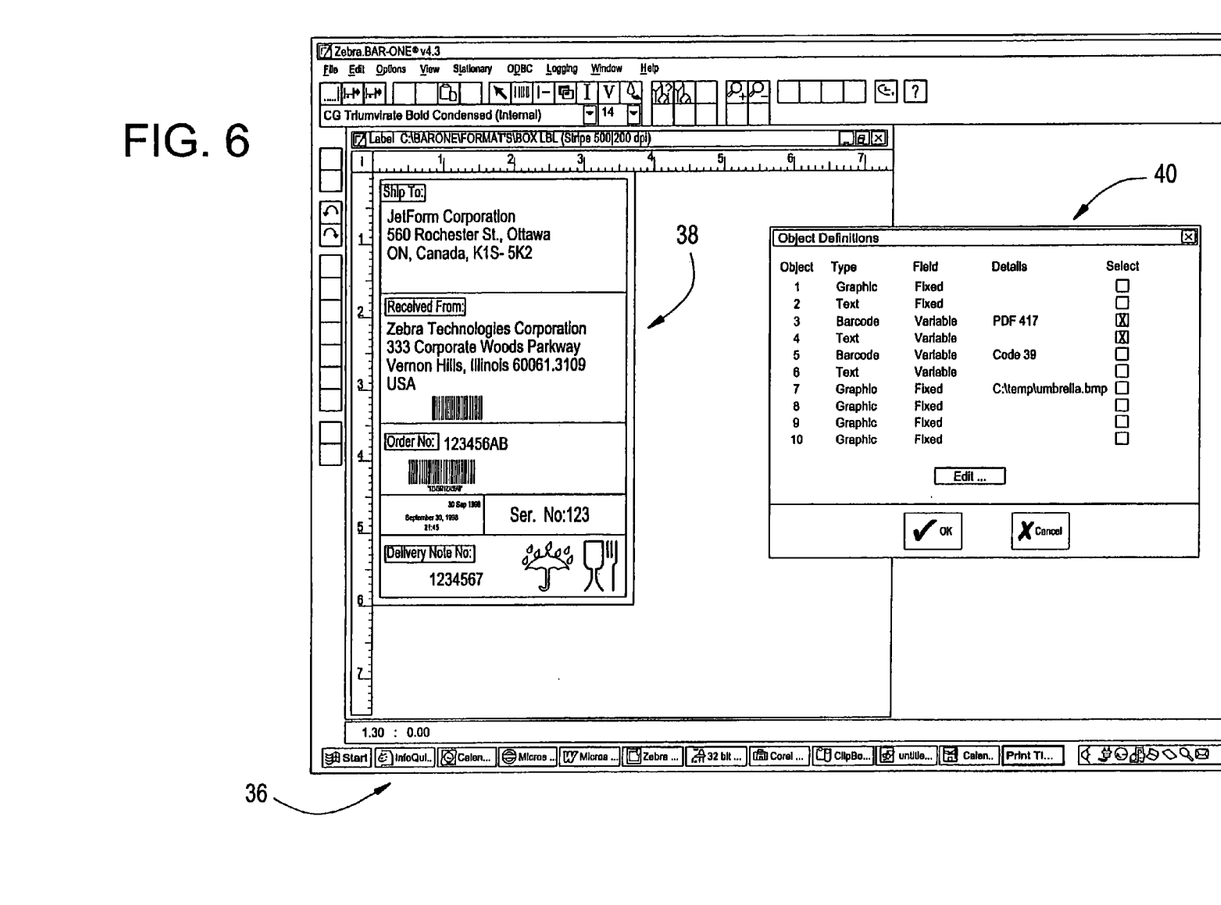
FIG. 6 is a screen shot showing the computer software package after the label shown in FIG. 3 has been scanned, and showing the computer software package prompting a user to confirm/change characterizations which have been made by the computer software package with regard to the scanned label.

As shown in FIG. 6, after the label 30 has been scanned, the computer software package preferably prompts the user (via window 40) to confirm and/or change the characterizations about the objects on the label which the computer software package has made. At such time, the user may confirm/change any of the characterizations, as well as link any of the objects to variable fields, and input embedded printer specific non-printing control codes, where the command codes subsequently do not physically print, but rather control specific features of a printer which subsequently uses the label format to print one or more labels. Once the label format has been created, it can be saved (see box 16 in FIG. 1).

Figure 7:
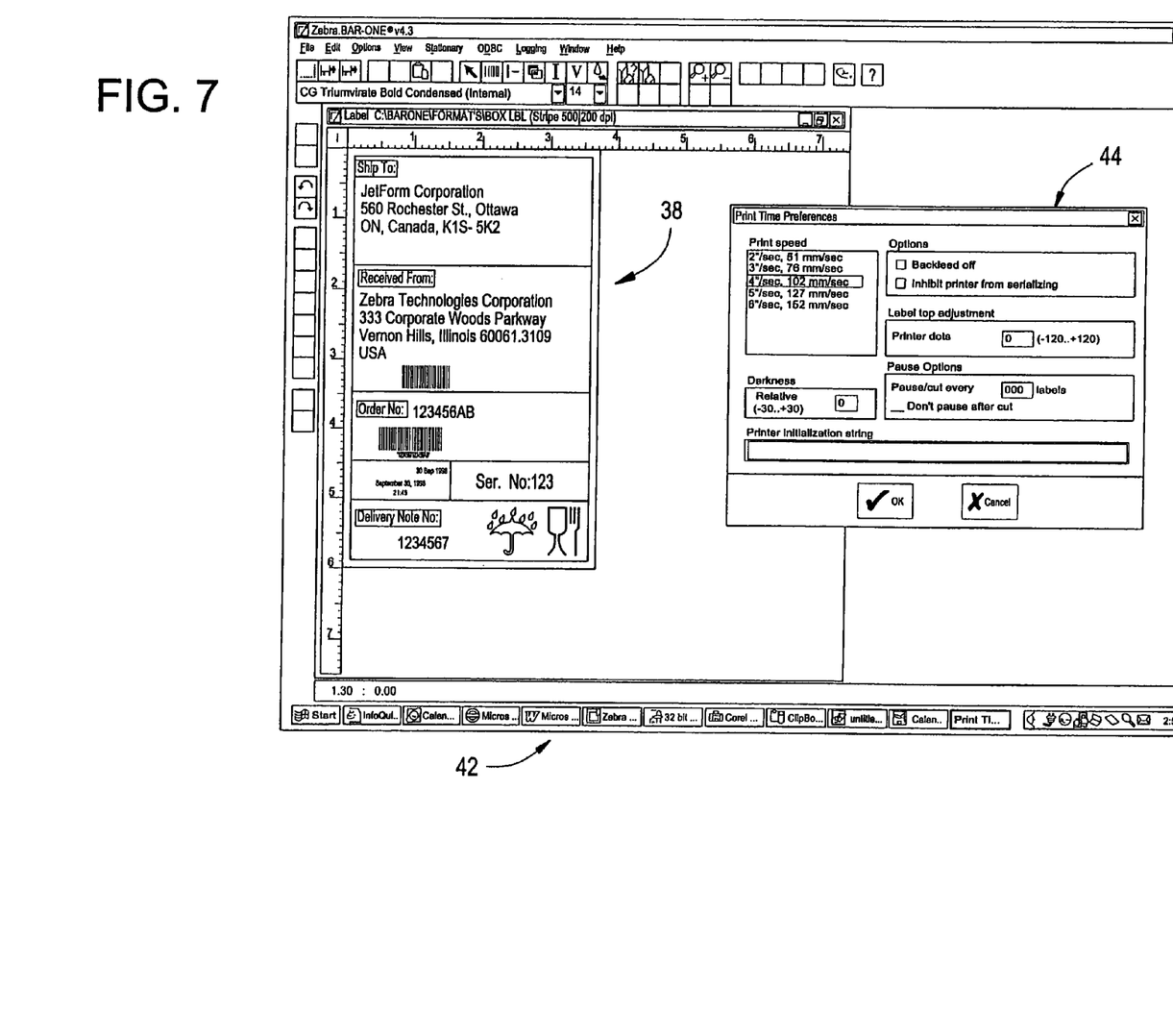
FIG. 7 is a screen shot showing the computer software package prompting a user to confirm print time preferences before a label is printed.

As shown in FIG. 2, one or more printers 28 may be connected to the computer 26. After a label format has been created, the user may direct the computer 26 to have one of the printers 28 print one or more labels based on the label format. As shown in FIG. 7, the computer software package may provide a screen shot 42 wherein the user is prompted (via window 44) confirm certain print time preferences before printing begins. Once the label has been printed, the label may appear exactly, or at least substantially similar to, the label shown in FIG. 3.

As described, the method (and computer software package) provides that a label format can be created by scanning an existing, printed label. As such, a user can easily import existing label formats that were not created using a given software package (or a compatible package), such as printer labels which were created in a printer-specific command language. Hence, the user does not have to manually create a similar label format from scratch, manually interpreting and measuring the different features and characteristics of the label.

Additionally, as described, the computer software package provides barcode OCR which is a distinct advantage over OCR which is currently available, which would characterize a barcode as being a mere graphic.

In all of the embodiments previously described, preferably the OCR is performed in a single scan of the label.

In another embodiment of the present invention, not only is the OCR preferably performed in a single scan, but additional data is input through software drivers that support other scanning devices that scan the original label. In other words, the label can be scanned with an optical scanner which performs OCR on the label. Subsequently, the label can be scanned by another type of scanner to gain additional information regarding, and further classify, items on the label. In other words, preferably the software is configured to provide multiple scanner input capability from different types of devices, such as: PC Based Optical Scanners, application specific barcode scanners/readers, RFID encoders/readers, as well as new devices as driver support becomes available. The method would be as illustrated in FIG. 1, and as described above, except box 10 would be as shown in FIG. 8.

Figure 8:
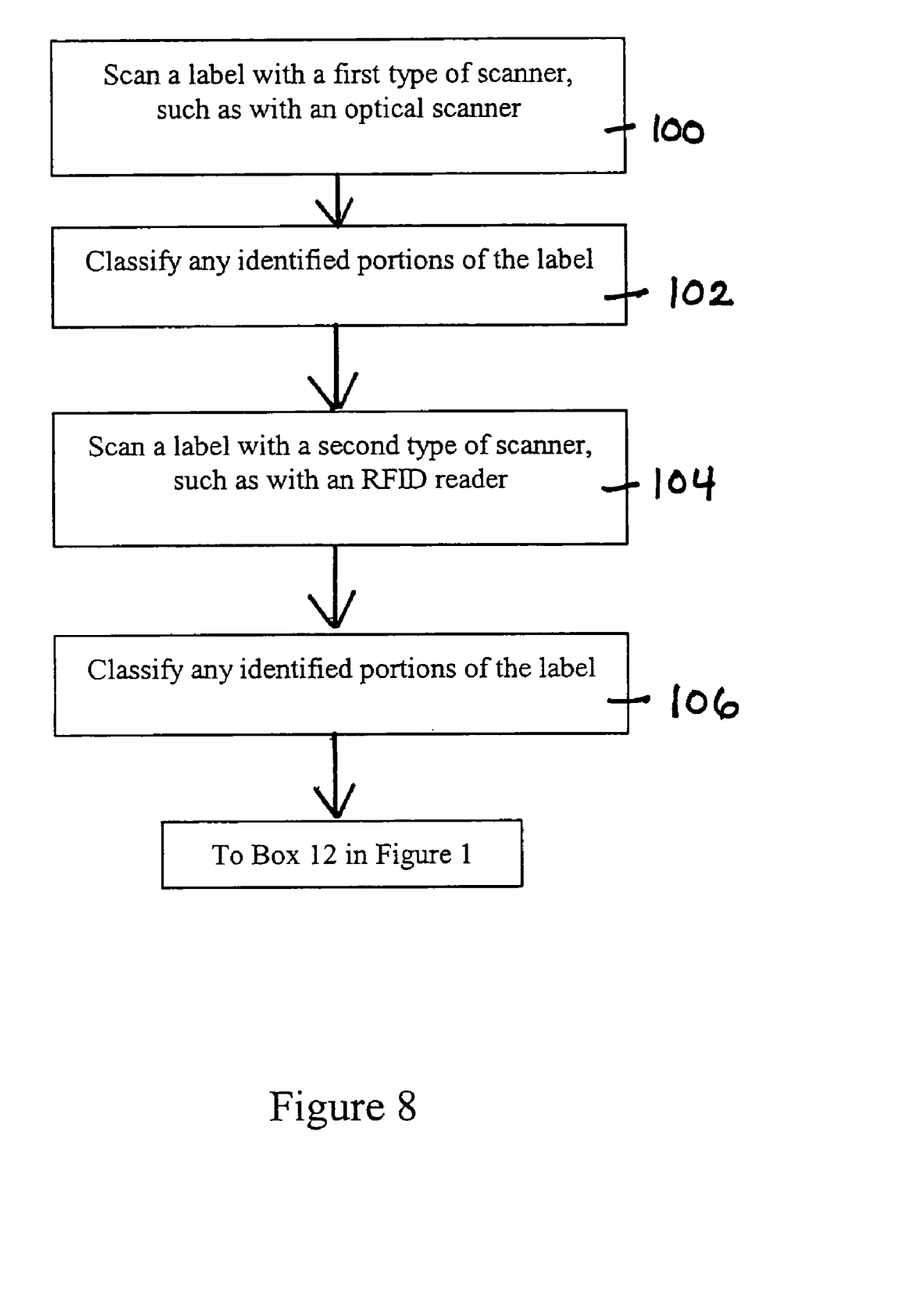
FIG. 8 is a block diagram of steps of another method of creating a label format, where the method is in accordance with another embodiment of the present invention.

For example, as shown in FIG. 8, after OCR scanning a "smart label" (a printed label with an embedded RFID tag containing information) using an optical scanner (box 100 in FIG. 8) and then classifying the identified portions of the label (as described above in connection with the previous embodiments) (box 102 in FIG. 8), the label is scanned by an RFID reader that reads information from the RFID tag on the label (box 104 in FIG. 8), and the software classifies the identified portions of the label (box 106 in FIG. 8). Preferably, the software is configured to allow the information to be embedded into a label format (box 12 in FIG. 1) to print and program "smart labels" on supported printers/encoders (box 18 in FIG. 1). This can be employed in a method to input data from symbologies that were not recognized by the Barcode OCR software (for example, the label being scanned may have a defect) but are instead read and inputted to the software through an alternate scanning device that supports the symbology rather than having to identify and characterize the symbology manually.

As such, RFID data can be input through an additional supported device and embedded into the label format for printing on supported printer/encoders. Preferably, the software provides that the RFID data can be reconfigured, changed, as well linked with variable fields.

The software can be configured such that a printed label is scanned and input into the Barcode OCR application in a single pass/scan, with additional input/characterization and clarification being capable through additional scans with other supported scanning devices (such as barcode scanners/readers, RFID encoder/readers, etc.) instead of just human input characterization. As shown in FIG. 1, preferably the method still provides that characterizations can be confirmed or changed, that objects can be linked to variable fields, and that specific non-printing control codes can be embedded (box 14 in FIG. 1).

Figure 9:
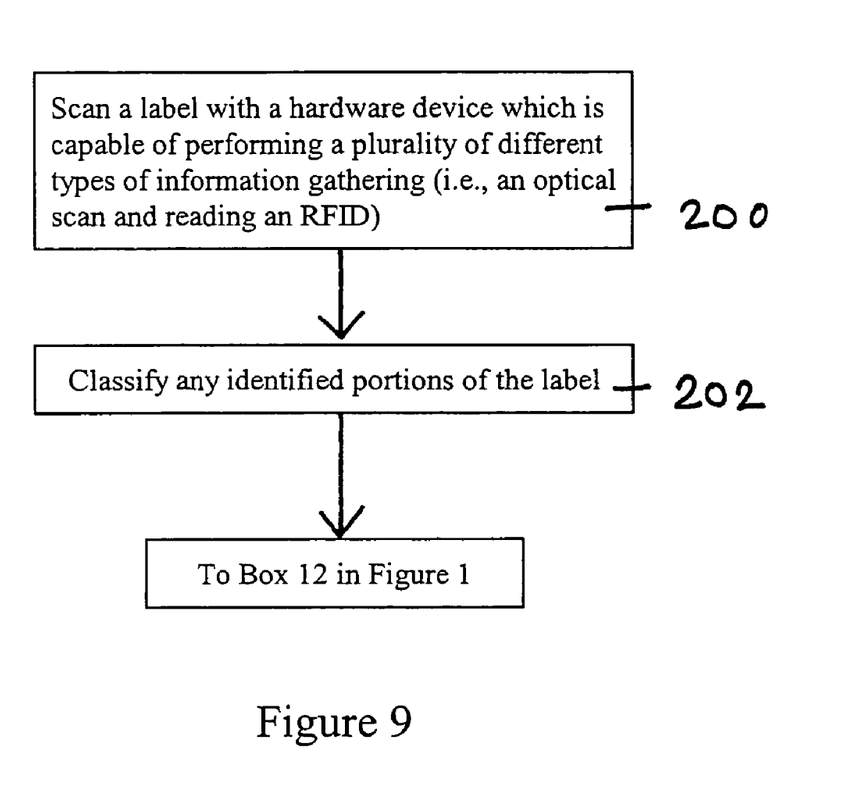
FIG. 9 is a block diagram of steps of another method of creating a label format, where the method is in accordance with still yet another embodiment of the present invention.

With regards to RFID capability and "smart labels", a hardware device could be provided which effectively combines the capability of current document scanners with OCR capability with an integrated RFID reader/encoder. This would allow the above "smart labels" to be reproduced in a single scanning pass, as shown in FIG. 9, where optical and RFID information is obtained in parallel. In other words, the hardware may effectively be a combined document scanner and RFID reader/encoder, which is capable of performing Barcode OCR of "smart labels" in a single scanning pass (i.e., wherein OCR is performed and an RFID tag is read in a single pass). The hardware device is used to scan/read the label (box 200 in FIG. 9), and any identified portions of the label are classified (box 202 in FIG. 9). Then the method from the box 12 as shown in FIG. 1.

While embodiments of the present invention are shown and described, it is envisioned that those skilled in the art may devise various modifications without departing from the spirit and scope of the foregoing description.

What is claimed is:

1. A label evaluating system for creating label formats, said system comprising: means for scanning a label to obtain information about the label by at least one of using a plurality of different types of scanners and using a single scanner which is configured to perform a plurality of different types of scans; and means for using the information obtained from the label during the at least one scan to generate a label format, said label format created from the scanned label thereafter being useable to print labels similar in format to the label which was scanned and used to create the label format.

2. A label evaluating system as recited in claim 1, wherein said means for using information obtained from the scan is configured to use optical character recognition (OCR) to process barcodes on the scanned label as barcodes.

3. A label evaluating system as recited in claim 1, wherein said means for using information obtained from the scan is configured to prompt a user, using a visual display, to confirm that the objects on the scanned label have been correctly characterized by the computer readable code.

4. A label evaluating system as recited in claim 3, wherein said means for using information obtained from the scan is configured to allow the user to change any of the characterizations made by the computer readable code.

5. A label evaluating system as recited in claim 3, wherein said means for using information obtained from the scan is configured to allow a user to link at least one object identified on the scanned label to a variable field.

6. A label evaluating system as recited in claim 3, wherein said means for using information obtained from the scan is configured to input embedded printer-specific non-printing control codes into the label format.

7. A label evaluating system as recited in claim 3, wherein said means for using information obtained from the scan is configured to provide that, once a label format has been created, said label format can be saved and printed.

8. A label evaluating system as recited in claim 1, wherein said means for scanning a label includes obtaining information contained on an RFID tag on the label and said means for using the information includes using the information to print a label which contains an RFID tag.

9. A label evaluating system as recited in claim 1, wherein said means for scanning is configured to perform an optical scan as well as read an RFID tag.

10. Computer software comprising computer readable code configured to create a printer label format based on a printed label that has been scanned, said computer readable code configured to scan a label by at least one of using a plurality of different types of scanners and using a single scanner which is configured to perform a plurality of different types of scans, and then use the scanned label to generate a label format, said label format created from the scanned label thereafter being useable to print labels similar in format to the label which was scanned and used to create the label format.

11. Computer software as recited in claim 10, wherein said computer readable code is configured to use optical character recognition (OCR) to process barcodes on the scanned label as barcodes.

12. Computer software as recited in claim 10, wherein said computer readable code is configured to prompt a user, using a visual display, to confirm that the objects on the scanned label have been correctly characterized by the computer readable code.

13. Computer software as recited in claim 12, wherein said computer readable code is configured to allow the user to change any of the characterizations made by the computer readable code.

14. Computer software as recited in claim 12, wherein said computer readable code is configured to allow a user to link at least one object identified on the scanned label to a variable field.

15. Computer software as recited in claim 10, wherein said computer readable code is configured to allow a user to input embedded printer-specific non-printing control codes into the label format.

16. Computer software as recited in claim 10, wherein said computer readable code is configured to provide that, once a label format has been created, said label format can be saved and printed.

17. Computer software as recited in claim 10, wherein said computer readable code is configured to read information contained on an RFID tag on the label and thereafter use the information to print a label which contains an RFID tag.

18. Computer software as recited in claim 10, wherein said computer readable code is configured to scan a label with a scanner which is configured to perform an optical scan as well as read an RFID tag.

19. A method of creating a printer label format: comprising scanning a label by at least one of using a plurality of different types of scanners and using a single scanner which is configured to perform a plurality of different types of scans; using the scanned label to generate the label format, and after scanning the printed label, and using the scanned label to generate a label format, using the label format created from the scanned label to print labels similar in format to the label which was scanned and used to create the label format.

20. A method as recited in claim 19, further comprising using optical character recognition (OCR) to process barcodes on the scanned label as barcodes.

21. A method as recited in claim 19, further comprising using optical character recognition (OCR) to determine at least one parameter about a barcode on the scanned label, said at least one parameter comprising at least one of aspect ratio, size and human readability.

22. A method as recited in claim 19, further comprising using a visual display to confirm that objects on the scanned label have been correctly characterized.

23. A method as recited in claim 19, further comprising linking at least one object identified on the scanned label to a variable field.

24. A method as recited in claim 19, further comprising embedding at least one printer-specific non-printing control code into the label format.

25. A method as recited in claim 19, wherein the step of scanning a printed label comprises using an optical scanner and an RFID reader.

26. A method as recited in claim 19, wherein the step of scanning a printed label comprises using a device which is configured to perform an optical scan as well as read an RFID tag.

* * * * *